(12) United States Patent
Cho

(10) Patent No.: US 7,961,444 B2
(45) Date of Patent: Jun. 14, 2011

(54) HIGH VOLTAGE POWER SUPPLY

(75) Inventor: Jong-hwa Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 394 days.

(21) Appl. No.: 12/014,293

(22) Filed: Jan. 15, 2008

(65) Prior Publication Data

US 2008/0266912 A1 Oct. 30, 2008

(30) Foreign Application Priority Data

Apr. 24, 2007 (KR) .................. 10-2007-0040058

(51) Int. Cl.
*H02H 7/00* (2006.01)
(52) U.S. Cl. ........................................ 361/18; 361/93.1

(58) Field of Classification Search .................... 361/18, 361/87, 93.1, 93.2; 323/276
See application file for complete search history.

(56) References Cited

U.S. PATENT DOCUMENTS 4,447,841 A * 5/1984 Kent .............................. 361/18

FOREIGN PATENT DOCUMENTS

JP 11055981 A * 2/1999

* cited by examiner

*Primary Examiner* — Jared J Fureman
*Assistant Examiner* — Christopher J Clark
(74) *Attorney, Agent, or Firm* — Staas & Halsey LLP

(57) ABSTRACT

A high voltage power supply includes a current overflow prevention unit to detect a change in a load of a device that is operated by an output power supplied from a transformer and to ground filtered signals that are input to first and second comparison units according to the detection result.

17 Claims, 2 Drawing Sheets

HIGH VOLTAGE POWER SUPPLY

CROSS-REFERENCE TO RELATED APPLICATION

This application claims the benefit of Korean Application No-2007-40058, filed on Apr. 24, 2007, in the Korean Intellectual Property Office, the disclosure of which is incorporated herein by reference.

BACKGROUND OF THE INVENTION

1. Field of the Invention

Aspects of the present invention relate to a stable high voltage power supply to prevent a current from overflowing therein during contact between a human body and a high voltage unit or during the application of an erroneous load, with regard to a conventional high alternating current (AC) voltage output method used for a non-impact laser printer or multifunctional device.

2. Description of the Related Art

FIG. 1 is a circuit diagram of a conventional high voltage power supply 100. Referring to FIG. 1, the conventional high voltage power supply 100 includes a controller 102 to output pulse width modulation (PWM) signals. First and second input units 104 and 112 receive the PWM signals PWM1, PWM2, and PWM3 from the controller 102. First and second comparison units 106 and 114 output comparison signals according to the PWM signals PWM1, PWM2, and PWM3. First and second switching units 108 and 116 each perform a switching operation according to the comparison signals. First and second transformers 110 and 118 transform output power according to the operations of the first and second switching units 108 and 116. A rectification unit 120 rectifies output power from the second transformer 118.

When the conventional high voltage power supply 100 receives PWM signals PWM1 and PWM2 from the controller 102 in order to output a high alternating current (AC) voltage, the PWM signal PWM1 is converted to a direct current (DC) level via an R/C circuit. The R/C circuit may be embodied as a low pass filter (LPF). The DC level is input to the first comparison unit 106 and compared with the PWM signal PWM2 in order to output a comparison signal. According to the comparison signal, the first switching unit 108 performs an on/off operation of a first transistor 109. Thus, the first switching unit 108 generates a pulse waveform having a Vcc electric potential. The pulse waveform is amplified by the first transformer 110 and is output as a high AC voltage to a final output end.

When the conventional high voltage power supply 100 receives a PWM 3 signal from the controller 102 in order to output a high DC voltage and the PWM 3 signal is low, a second transistor 113 of the second input unit 112 is turned on. At this point, an electric potential of a collector is input to a non-inversion end (+) of the second comparison unit 114. The Vcc electric potential distributed by resistance is input to an inversion end (−) of the second comparison unit 114. The second comparison unit 114 compares the Vcc electric potential with the electric potential of the collector that is input to the non-inversion end (+) of the second comparison unit 114 to output a comparison signal.

The second switching unit 116 performs a switching operation according to the comparison signal output by the second comparison unit 114. The second transformer 118 transforms power output by the switching operation of the second switching unit 116. The rectification unit 120 rectifies the transformed power to output the high DC voltage. The high DC voltage is applied to a second side of the first transformer 110. The high AC voltage that is a result of the transformation by the first transformer 110 and the high DC voltage provided from the rectification unit 120 overlap in the second side of the first transformer 110 and are output to a device 130. The device 130 may be, for example, a developer.

The stability standard of a high voltage power supply provides that when the high voltage power supply outputs a high voltage, current levels are limited so that electrical resistance equal to approximately the electrical resistance of human skin (e.g., 2 kΩ) is applied to an output end of the high voltage power supply to limit the amount of current flowing into the output end. For example, a DC is limited to 2 mA and an AC having a frequency is limited to 0.7 mA×the frequency.

However, a conventional circuit, which is a power supply that receives a PWM signal transmitted by a CPU and generates a high voltage, outputs a constant voltage regardless of a change in load. When a user opens a cover of the image forming device to take out the developer, the user is likely to be exposed to a high voltage terminal. Conventionally, a switch is installed in the cover to switch off the high voltage circuit when the cover is opened. However, when the cover is open, although an input voltage (24 V) of the high voltage circuit is switched off, the switch for opening the cover may be defective, or other abnormal errors may occur. In this case, the high voltage terminal is exposed to the user when the developer is taken out of the image forming device, which can cause an electric shock. As a result, the user may received an electric shock, and the developer of a high voltage output end may be grounded and shorted, which causes circuit damage.

SUMMARY OF THE INVENTION

Aspects of the present invention provide a high voltage power supply that detects a change in the load of a device that uses an output power, and when an erroneous load is detected, quickly disables an output, informs a controller of the information, and prevents an input signal of the high voltage power supply.

According to an aspect of the present invention, a high voltage power supply includes a controller to provide pulse width modulation (PWM) signals, first and second input units to respectively receive the PWM signals from the controller and to output filtered PWM signals, first and second comparison units to respectively output comparison signals according to comparisons of the filtered PWM signals and respective reference signals, first and second switching units to respectively perform switching operations for a power supply to output power according to the comparison signals of the first and second comparison units, first and second transformers to respectively transform the output power according to the switching operations of the first and second switching units, a rectification unit to rectify the output power transformed by the second transformer and to output the rectified power to the first transformer, and a current overflow prevention unit to detect a change in a load of a device that is operated by the rectified output power supplied from the rectification unit and to ground the filtered PWM signals that are input to the first and second comparison units according to a detection result.

According to another aspect of the present invention, a high voltage power supply includes a controller to provide a PWM signal, a comparison unit to compare a signal corresponding to the PWM signal provided from the controller and a reference signal to produce a comparison signal, a switching unit to perform a switching operation of a power supply to output power according to the comparison signal, a transformer to transform the output power according to the switching operation of the switching unit, and a current overflow prevention unit to detect a change in a load of a device that is operated by the output power supplied from the transformer and to ground a signal that is input to the comparison unit according to a detection result.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
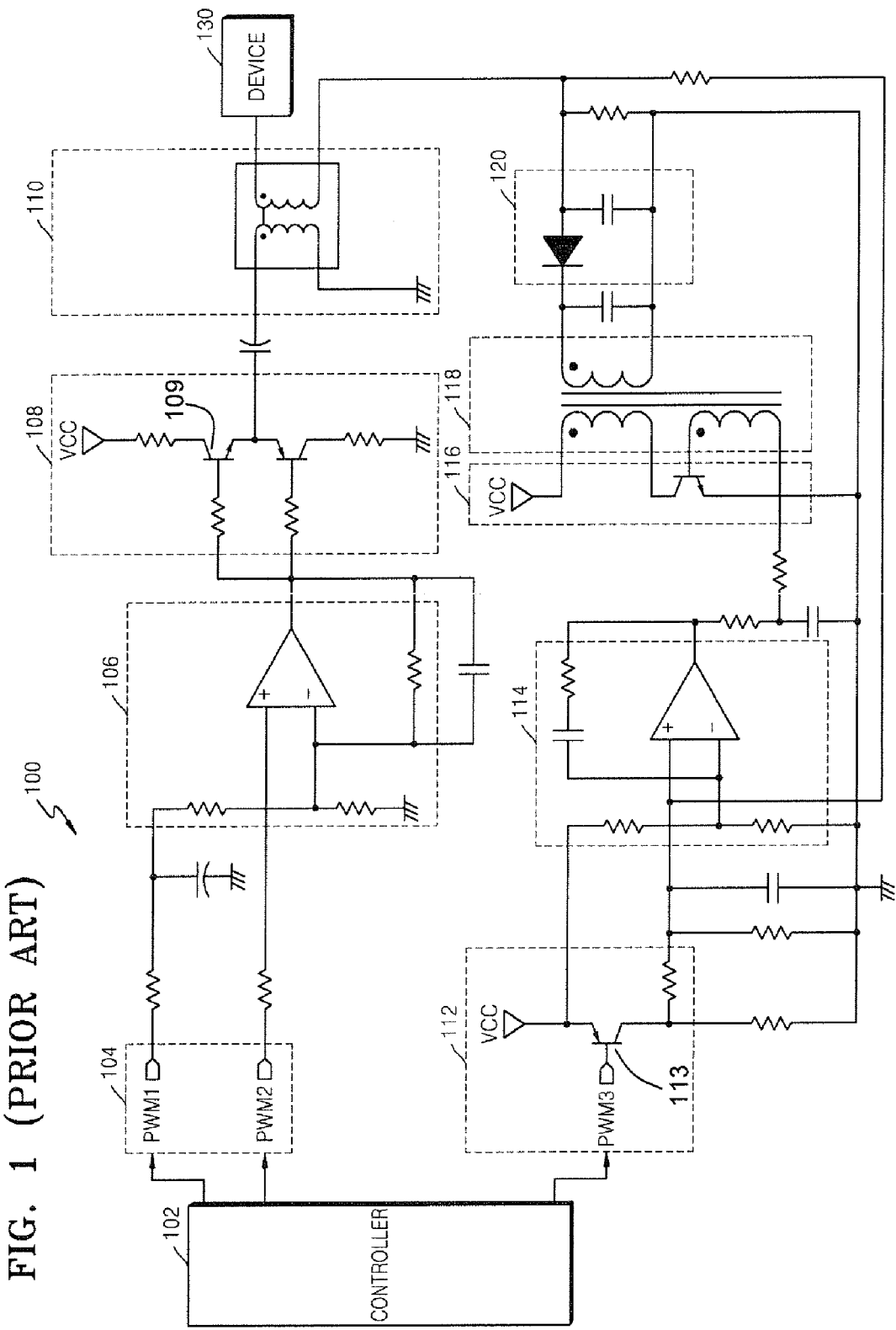
FIG. 1 is a circuit diagram of a conventional high voltage power supply.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
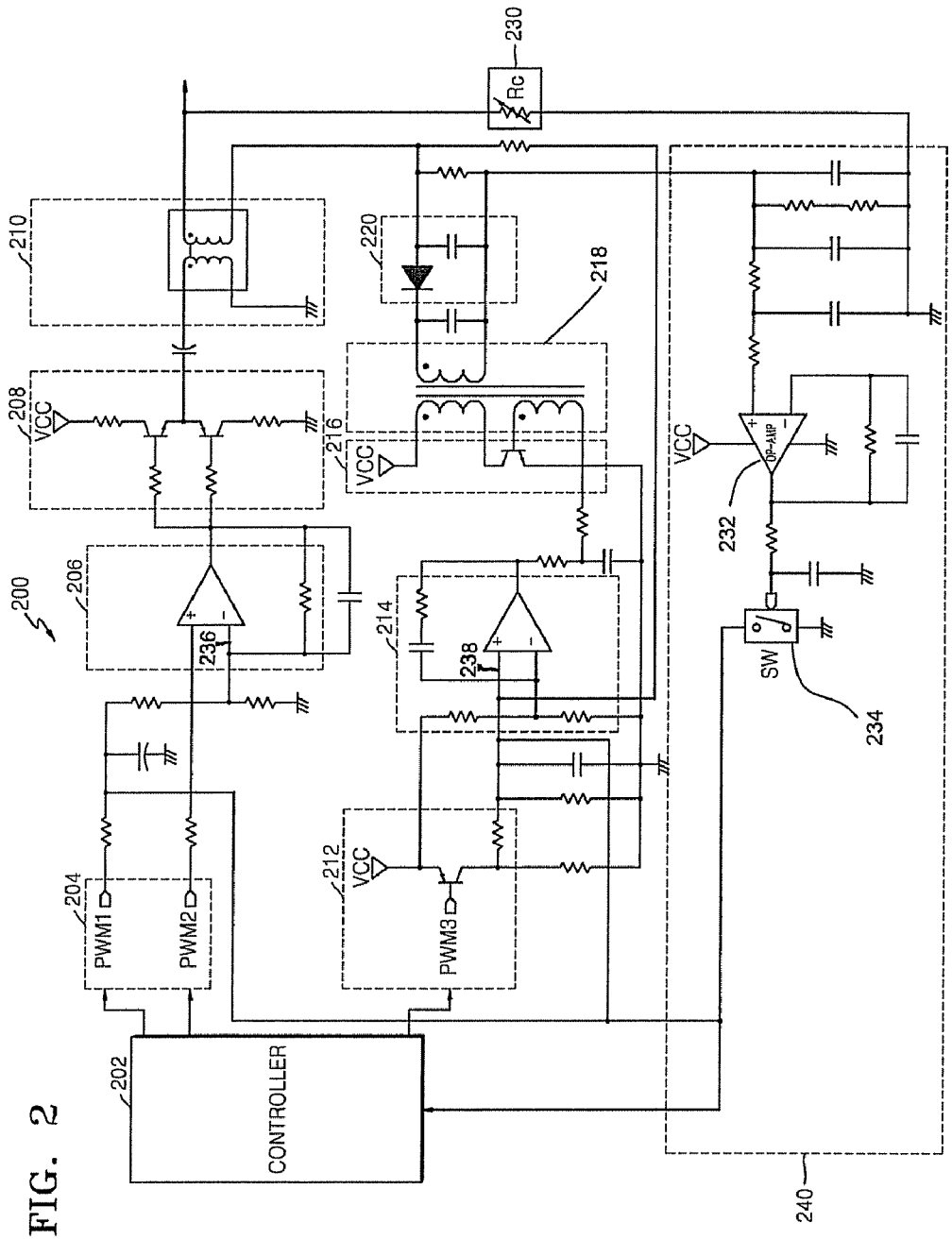
FIG. 2 is a circuit diagram of a high voltage power supply according to an embodiment of the present invention.

FIG. 2 is a circuit diagram of a high voltage power supply 200 according to an embodiment of the present invention. Referring to FIG. 2, the high voltage power supply 200 includes a controller 202 to provide pulse width modulation (PWM) signals PWM1, PWM2, and PWM3. First and second input units 204 and 212 receive the PWM signals PWM1, PWM2, and PWM3 transmitted from the controller 202. First and second comparison units 206 and 214 output comparison signals according to the comparison of the PWM signals PWM1, PWM2, and PWM3 filtered by the first and second input units 204 and 212 and a reference signal. First and second switching units 208 and 216 perform a switching operation for a power supply according to the comparison signals of the first and second comparison units 206 and 214. First and second transformers 210 and 218 transform output power according to the switching operation of the first and second switching units 208 and 216. A rectification unit 220 rectifies output power transformed by the second transformer 218 and outputs the rectified power to a second side of the first transformer 210 opposite the first side of the first transformer 210 connected to the first switching unit 208. In particular, the high voltage power supply 200 further includes a current overflow prevention unit 240 to detect a change in the load of a device 230 and, when an error is detected, to perform a switching operation for disabling a circuit. It is understood that the high voltage power supply 200 according to other aspects of the present invention may have other components instead of or in addition to those shown in FIG. 2 and described above, such as additional resistors, capacitors, comparison units, switching units, transformers, and rectification units. Additionally, the device 230 may be various different types of components used in an image forming apparatus, such as developers, fusing rollers, transfer rollers, or a combination thereof. Moreover, aspects of the present invention are not limited to being applied to image forming apparatuses, and may instead by applied to a wide variety of other electrical devices.

The controller 202 outputs PWM signals PWM1 and PWM2 to the first input unit 204 in order to output a high alternating current (AC) voltage. The PWM signal PWM1 that is input to the first input unit 204 is converted into having a direct current (DC) level via an R/C circuit. According to an aspect of the present invention, the R/C circuit is embodied as a low pass filter (LPF), although is not limited thereto, and may be another type of filter, such as a bandpass filter. The DC level is input to an inversion end (−) of the first comparison unit 206. The PWM signal PWM2 is input to a non-inversion end (+) of the first comparison unit 206. The first comparison unit 206 compares the PWM signal PWM1 of the DC level and the PWM signal PWM2 and outputs a comparison signal corresponding to the comparison result to the first switching unit 208. The first switching unit 208 generates a pulse waveform of Vcc electric potential in response to the comparison signal transmitted from the first comparison unit 206 and outputs the pulse waveform to the first transformer 210. The first transformer 210 amplifies power of the pulse waveform and outputs the high AC voltage to an output end on a first side of the first transformer 210.

The controller 202 outputs a PWM signal PWM3 to the second input unit 212 in order to output a high DC voltage. When the PWM signal PWM3 is low, a transistor of the second input unit 212 is turned on, and an electric potential of a collector is input to a non-inversion end (+) of the second comparison unit 214. The Vcc electric potential distributed by resistance is input to an inversion end (−) of the second comparison unit 214. The second comparison unit 214 compares the electric potential that is input to the non-inversion end (+) thereof with the electric potential that is input to the inversion end (−) thereof and outputs a comparison signal to the second switching unit 216. The second switching unit 216 performs a switching operation according to the comparison signal, generates the pulse waveform of Vcc electric potential, and outputs the pulse waveform to the second transformer 218. The second transformer 218 amplifies power of the pulse waveform. The amplified high AC voltage is output to the rectification unit 220. The rectification unit 220 rectifies the transformed power and outputs the high DC voltage.

In detail, the rectification unit 220 rectifies the transformed power and outputs the high DC voltage to the second side of the first transformer 210. According to an aspect of the present invention, the second side of the first transformer 210 is opposite a first side which is connected to the first switching unit 208, as shown in FIG. 2. The high AC voltage provided by the first transformer 210 and the high DC voltage provided by the rectification unit 220 overlap in the second side of the first transformer 210 and are output to the device 230.

According to an aspect of the present invention, the device 230 is a developer of an image forming device. An overlapped power of AC and DC is supplied to the image forming device in order to operate the developer. However, the device 230 operated by the high voltage output power supply 200 may have a load "0" indicating that the device 230 is grounded, or may have a resistance value below a predetermined load (e.g., 2 kΩ). In this case, a circuit of the image forming device may be damaged or an electric shock may be generated when a user accesses the image forming device in order to change the developer. However, it is understood that the device 230 is not limited to being a developer in all aspects, and may instead be various other types of devices used in an image forming apparatus, such as fusing rollers, transfer rollers, discharge rollers, belts, laser scanning units, etc. Additionally, aspects of the present invention are not limited to being applied to image forming apparatuses, and may instead be applied to various other types of apparatuses, such as computers, televisions, stereos, etc.

In order to avoid circuit damage and/or electric shock to a user, the current overflow prevention unit 240 of the high voltage power supply 200 detects the change in the load of the device 230 and grounds filtered signals provided to the first and second comparison units 206 and 214 according to a detection result. The device 230 is connected to a ground terminal of the current overflow prevention unit 240. The current overflow prevention unit 240 includes an operation amplifier OP-AMP 232, a ground switching unit SW 234, and a plurality of resistors and capacitors. Although FIG. 2 depicts the current overflow prevention unit 240 as having six resistors and five capacitors, it is understood that the current overflow prevention unit 240 may have more or less than six resistors and five capacitors in other aspects of the present invention, and may be otherwise configured.

The operation amplifier OP-AMP 232 outputs a low or high comparison signal according to the change in the load of the device 230. A non-inversion end (+), one of the input ends of the operation amplifier OP-AMP 232, is connected to an output end of the rectification unit 220.

When the load of the device 230 is below the predetermined load (e.g., 2 kΩ) or the device 230 short circuits, the operation amplifier OP-AMP 232 outputs a comparison signal to the ground switching unit SW 234 so that the ground switching unit SW 234 performs an on-switching operation. For example, when the device 230 has a constant normal load value, the operation amplifier OP-AMP outputs the low comparison signal. When the load of the device 230 drops below 2 kΩ or short circuits, a change occurs in the signal that is input to the input ends of the operation amplifier OP-AMP so that the operation amplifier OP-AMP outputs the high comparison signal.

The ground switching unit SW 234 performs the on-switching operation or an off-switching operation according to the low or high comparison signal of the operation amplifier OP-AMP 232. For example, if the ground switching unit SW 234 receives the low comparison signal from the operation amplifier OP-AMP, the ground switching unit SW performs the off-switching operation. If the ground switching unit SW receives the high comparison signal from the operation amplifier OP-AMP, the ground switching unit SW performs the on-switching operation. It is understood that the terms "low" and "high" may be switched with respect to the comparison signals.

One end of the ground switching unit SW 234 is connected to a first line 236 that is input to the inversion end (−) of the first comparison unit 206. Another end of the ground switching unit SW 234 opposite the one end is grounded. The first line 236 is connected to a second line 238 that is input to the non-inversion end (+) of the second comparison unit 214. Therefore, when the load of the device 230 is below a predetermined minimum value, such as, for example, 2 kΩ, or the device 230 is short circuited, if the second switching unit 216 performs the on-switching operation, the signal that is input to the inversion end (−) of the first comparison unit 206 is grounded so that the operation of the first comparison unit 206 stops. Thus, the device 230 is prevented from being supplied with power, thereby protecting the image forming device and securing user safety.

The ground switching unit SW 234 applies an on-switching signal to the controller 202 according to whether the ground switching unit SW 234 performs the on-switching operation. To this end, the ground switching unit SW 234 is connected to the controller 202.

The controller 202 outputs a command to stop the operations of the high voltage power supply 200 in response to the on-switching signal of the ground switching unit SW and disables PWM signals PWM1, PWM2, and PWM3 that are applied to the first and second input units 204 and 212. If the controller 202 outputs the command (e.g., a print stop command) according to the on-switching signal, a printing job stops. Thus, power is no longer supplied to the high voltage power supply 200, thereby protecting the image forming device and securing user safety.

The high voltage power supply 200 according to aspects of the present invention detects a change in the load of the device 230 that uses an output power, and if an error in the load is detected, quickly disables an output thereof, delivers related information to the controller 202, and prevents a signal from being input into the high voltage power supply 200 in order to control the output thereof. Therefore, when the load of the device 230 of a high voltage output end is below a reference value or is grounded, the high voltage power supply 200 disables the signal so as to prevent a high voltage from being generated, thereby protecting the high voltage power supply 200 and securing user safety when the output end is grounded or short circuited.

Although a few embodiments of the present invention have been shown and described, it would be appreciated by those of ordinary skill in the art that various changes may be made in the embodiments without departing from the spirit and scope of the present invention, the scope of which is defined by the following claims and their equivalents.

What is claimed is:

1. A high voltage power supply, comprising:
    a controller to provide pulse width modulation (PWM) signals;
    first and second input units to respectively receive at least one of the PWM signals from the controller and to output filtered PWM signals;
    first and second comparison units to respectively output comparison signals according to comparisons of the filtered PWM signals and respective reference signals;
    first and second switching units to respectively perform switching operations for a power supply to output power according to the comparison signals of the first and second comparison units;
    first and second transformers to respectively transform the output power according to the switching operations of the first and second switching units;
    a rectification unit to rectify the output power transformed by the second transformer and to output the rectified output power to the first transformer; and
    a current overflow prevention unit to detect a change in a load of a device that is operated by the rectified output power supplied from the rectification unit and to ground the filtered PWM signals that are input to the first and second comparison units according to a detection result,
    wherein the current overflow prevention unit comprises
        an operation amplifier to output an on-switching comparison signal when a load impedance of the device has changed below a predetermined load impedance or when the device is grounded; and a ground switching unit to perform an on-switching operation when the on-switching comparison signal is output by the operation amplifier, to ground the filtered PWM signals that are input to the first and second comparison units, and to apply an on-switching signal to the controller.

2. The high voltage power supply of claim 1, wherein the current overflow prevention unit comprises a ground end, and the device is connected to the ground end of the current overflow prevention unit.

3. The high voltage power supply of claim 1, wherein the ground switching unit has one end connected to a line that is input to an inversion end of the first comparison unit and another end that is grounded.

4. The high voltage power supply of claim 1, wherein the ground switching unit has one end connected to a line that is input to a non-inversion end of the second comparison unit and another end that is grounded.

5. The high voltage power supply of claim 1, wherein the controller outputs a command to stop operations of the high voltage power supply in response to the on-switching signal applied by the ground switching unit, and disables the PWM signals that are applied to the first and second input units.

6. The high voltage power supply of claim 1, wherein the device is a developer used in an image forming device.

7. A high voltage power supply, comprising:
a controller to provide pulse width modulation (PWM) signals;
first and second input units to respectively receive at least one of the PWM signals from the controller and to output filtered PWM signals;
first and second comparison units to respectively output comparison signals according to comparisons of the filtered PWM signals and respective reference signals;
first and second switching units to respectively perform switching operations for a power supply to output power according to the comparison signals of the first and second comparison units;
first and second transformers to respectively transform the output power according to the switching operations of the first and second switching units;
a rectification unit to rectify the output power transformed by the second transformer and to output the rectified output power to the first transformer; and
a current overflow prevention unit to detect a change in a load of a device that is operated by the rectified output power supplied from the rectification unit and to ground the filtered PWM signals that are input to the first and second comparison units according to a detection result,
wherein the current overflow prevention unit comprises an operation amplifier to selectively output a low comparison signal and a high comparison signal according to the change in the load of the device and a ground switching unit to perform an on-switching operation according to the high comparison signal output by the operation amplifier and an off-switching operation according to a low comparison signal output by the operation amplifier, and
the ground switching unit has one end connected to a line that is input to an inversion end of the first comparison unit and to a non-inversion end of the second comparison unit and another end that is grounded, and the ground switching unit applies an on-switching signal to the controller to shut down operations of the high voltage power supply if the on-switching operation occurs.

8. A high voltage power supply comprising:
a controller to provide a PWM signal;
a comparison unit to compare a signal corresponding to the provided PWM signal and a reference signal to produce a comparison signal;
a switching unit to perform a switching operation of a power supply to output power according to the comparison signal;
a transformer to transform output power according to the switching operation of the switching unit; and
a current overflow prevention unit to detect a change in a load of a device that is operated by the output power supplied from the transformer and to ground a signal that is input to the comparison unit according to a detection result,
wherein the current overflow prevention unit comprises
an operation amplifier to output an on-switching comparison signal when a load impedance of the device has changed below a predetermined load impedance or when the device is grounded, and
a ground switching unit to perform an on-switching operation when the on-switching comparison signal is output by the operation amplifier, to around the filtered PWM signal that is input to the comparison unit, and to apply an on-switching signal to the controller.

9. The high voltage power supply of claim 8, wherein the current overflow prevention unit comprises a ground end, and the device is connected to the ground end of the current overflow prevention unit.

10. The high voltage power supply of claim 8, wherein the ground switching unit has one end connected to a line that is input to an inversion end of the first comparison unit and another end that is grounded.

11. The high voltage power supply of claim 8, wherein the ground switching unit has one end connected to a line that is input to a non-inversion end of a second comparison unit and another end that is grounded.

12. The high voltage power supply of claim 8, wherein the controller outputs a command to stop operations of the high voltage power supply in response to the on-switching signal of the ground switching unit, and disables the PWM signal that is applied to the input unit.

13. The high voltage power supply of claim 8, wherein the device is a developer used in an image forming device.

14. A high voltage power supply used to power a device in an image forming apparatus, comprising:
a controller to provide a control signal used to control whether the power is to be supplied to the device and to not provide the control signal according to a load error signal;
a comparison unit disposed between the controller and the device to compare the provided control signal with a reference signal and to control a supply of the power to the device according to a comparison result; and
a current overflow prevention unit disposed between the controller and the device to detect an error in a load of the device, and to ground the provided control signal and to send the load error signal according to a detection result,
wherein the current overflow prevention unit comprises an operation amplifier to output an on-switching comparison signal when the error in the load of the device is detected, and to output the load error signal to the controller to stop operations of the high voltage power supply according to the detection result, and a ground switching unit to perform on-switching operation to ground the control signal when the on-switching comparison signal is output by the operation amplifier.

15. The high voltage power supply of claim 14, wherein if the current overflow prevention unit detects no error in the load, the current overflow prevention unit allows the control signal to be provided to the comparison unit, and if the current overflow prevention unit detects the error in the load, the current overflow prevention unit grounds the control signal.

16. The high voltage power supply of claim 14, further comprising:

a switching unit disposed between the comparison unit and the device to perform a switching operation of a power supply to supply the power according to the comparison result; and a transformer disposed between the switching unit and the device to transform the power output from the switching unit.

17. The high voltage power supply of claim 14, wherein the device comprises a developer.

* * * * *

UNITED STATES PATENT AND TRADEMARK OFFICE
CERTIFICATE OF CORRECTION

| | | |
|---|---|---|
| PATENT NO. | : 7,961,444 B2 | Page 1 of 1 |
| APPLICATION NO. | : 12/014293 | |
| DATED | : June 14, 2011 | |
| INVENTOR(S) | : Jong-hwa Cho | |

It is certified that error appears in the above-identified patent and that said Letters Patent is hereby corrected as shown below:

Column 8, Line 27 (Approx.), In Claim 8, delete "around" and insert -- ground --, therefor.

Signed and Sealed this
Twenty-eighth Day of February, 2012

David J. Kappos
*Director of the United States Patent and Trademark Office*